United States Patent [19]

Leliaert

[11] 4,080,760
[45] Mar. 28, 1978

[54] SURFACE TREATMENT DEVICE INCLUDING MAGNETIC SHOT SEPARATOR

[75] Inventor: Raymond M. Leliaert, South Bend, Ind.

[73] Assignee: Wheelabrator-Frye Inc., Hampton, N.H.

[21] Appl. No.: 770,093

[22] Filed: Feb. 18, 1977

[51] Int. Cl.² .............................................. B24C 9/00
[52] U.S. Cl. ...................................... 51/425; 209/226
[58] Field of Search ............ 51/425; 209/223 A, 224, 209/225, 226, 227, 295

[56] References Cited

U.S. PATENT DOCUMENTS

| 463,305 | 11/1891 | Hoffman | 209/226 |
|---|---|---|---|
| 1,485,401 | 3/1924 | McDonough | 209/295 X |
| 3,716,946 | 2/1973 | Graf | 51/425 X |
| 3,856,666 | 12/1974 | Yashima | 209/226 X |
| 3,858,359 | 1/1975 | Laliaert | 51/425 |
| 3,900,969 | 8/1975 | Diehn | 51/424 |
| 3,934,374 | 1/1976 | Laliaert | 51/425 |

Primary Examiner—Gary L. Smith
Attorney, Agent, or Firm—McDougall, Hersh & Scott

[57] ABSTRACT

A magnetic separator is disclosed suitable for incorporation in a surface treatment device, such as, a particulate throwing wheel employing a rebound system to recycle the particulate. The separator includes a porous rotating drum having a set of magnets therebeneath to attract ferromagnetic particulate. A portion of the drum is pressurized so that nonmagnetic debris intermingled with the particulate is blown free and conveyed to a dust collector.

16 Claims, 3 Drawing Figures

SURFACE TREATMENT DEVICE INCLUDING MAGNETIC SHOT SEPARATOR

BACKGROUND OF THE INVENTION

This invention relates to the field of surface treatment devices. More particularly, it relates to devices which incorporate centrifugal blasting wheels to clean, abrade or otherwise condition a surface. Such devices, such as the type manufactured by Wheelabrator-Frye, Inc. of Mishawaka, Indiana, employ abrasive particulate, such as, steel shot or grit to effect the surface treatment. In order to obtain efficient and economical operation it is necessary to recover the particulate, separate it from the debris generated by the treatment process and recycle it for further treatment.

A number of devices have been developed which incorporate a particulate throwing wheel and provide means for returning the rebounding abrasive to the throwing wheel. A particular problem with such devices is removing sand, dust, paint chips and similar debris generated by the blasting process. Failure to do so adversely affects the equipment and reduces the efficiency of the device. In the prior art various methods have been used to effect separation of shot from debris as, for example, the use of air wash separators and the use of rotating magnetic drums to attract the ferromagnetic particulate. Exemplary of the magnetic drum devices are U.S. Pat. Nos. 3,934,373 and 3,858,359, both of which are assigned to the present assignee. These devices employ a rotating nonmagnetic drum with a plurality of magnets positioned behind the drum for the purposes of attracting ferromagnetic abrasive to the drum whereby rotation of the drum conveys the attracted abrasive to a recovery means.

A problem encountered with devices of this type is the tendency of debris to intermingle or otherwise adhere to the ferromagnetic particulate and thus be carried along resulting in an undesirable accumulation of debris in the surface treatment apparatus.

It is accordingly an object of the present invention to provide an improved abrasive recovery system for a surface treatment device.

A further object of the invention is to provide an improved shot recovery system which includes means for positively separating abrasive from debris.

A further object of the invention is to provide a magnetic drum type separator which employs air under pressure to remove any nonmagnetic debris which is intermingled with the magnetic shot attracted to the drum.

Another object of the invention is to provide an improved surface treatment device which efficiently and affirmatively separates debris from shot so that the shot may be reused.

A further object of the invention is to provide an improved surface treatment device in which there is provided primary and secondary debris removal systems, the primary system removing the majority of debris while the secondary system removing debris which is intermingled with the recovered shot.

Other objects and advantages of the invention will be apparent from the remaining portion of the specification.

SUMMARY OF THE INVENTION

According to the invention surface treatment is accomplished by use of a particulate throwing wheel. The rebounding particulate is channeled upwardly through a scroll shaped rebound corridor to a magnetic drum separator. The ferromagnetic shot is attracted to the drum which rotates to a position where the shot drops into the supply hopper for the wheel. An air flow system through the device removes a substantial portion of dust and debris. A second air system provided in the rotating drum, which is porous, is effective for removing any debris which is intermingled with the shot on the surface of the rotating drum.

DETAILED DESCRIPTION

Figure 1:
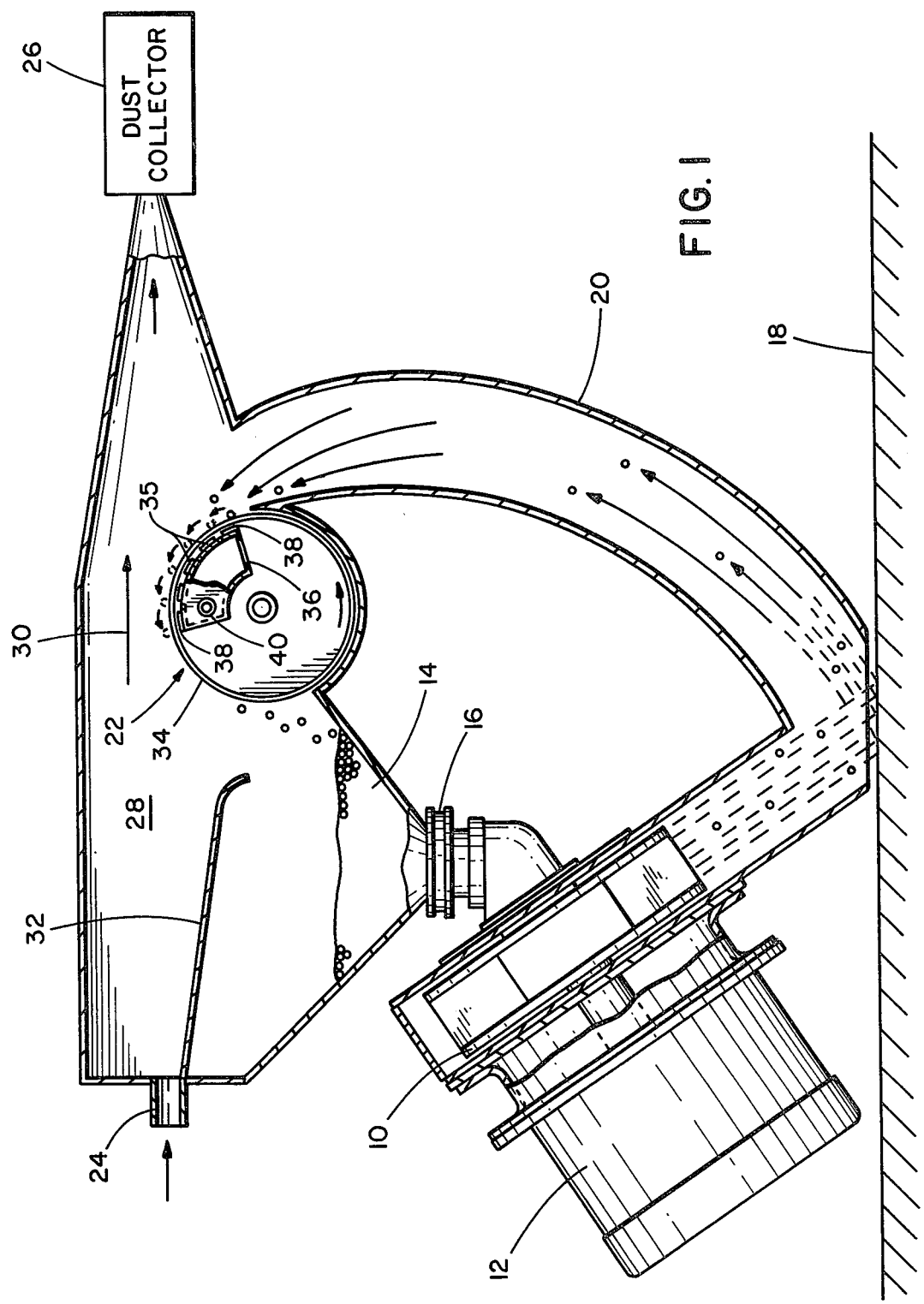
FIG. 1 is a side elevational view illustrating the essential features of the invention.

Referring to FIG. 1, a surface treatment device incorporating the features of the invention is illustrated. The device includes a high speed particulate throwing wheel 10 driven by a motor 12. Particulate is supplied to the throwing wheel 10 from a supply hopper 14 via a control valve 16. In the FIG. 1 embodiment the abrasive is projected downwardly onto a surface 18 under treatment. The particulate employed in this device may be steel shot, steel grit or other ferromagnetic particles. Due to the high velocity with which the blades 11 of the throwing wheel project the particulate onto the surface, substantial kinetic energy remains after impact. Accordingly, it is possible and highly desirable to channel the rebounding abrasive back to the hopper 14 for reuse. For that purpose a scroll-shaped rebound corridor 20 is provided which terminates adjacent a magnetic separator 22 according to the invention.

The surface treatment process causes the rebounding particulate to carry with it significant quantities of debris which may comprise sand, dust, paint particles, rust and the like, depending upon the condition of the surface being treated. A primary system for removing the debris carried wth the rebounding shot is provided by an air system including an air inlet 24 and a dust collector 26. The dust collector, which is of conventional design includes a suction fan for pulling a stream of air across the channel 28 in the direction indicated by arrow 30. A baffle 32 may be provided to increase the velocity of the air flow through the channel 28. This primary debris removal system is effective for removing a substantial portion of the debris carried by rebounding particulate. The balance of the debris is removed by the magnetic drum separator 22 now to be described.

Figure 2:
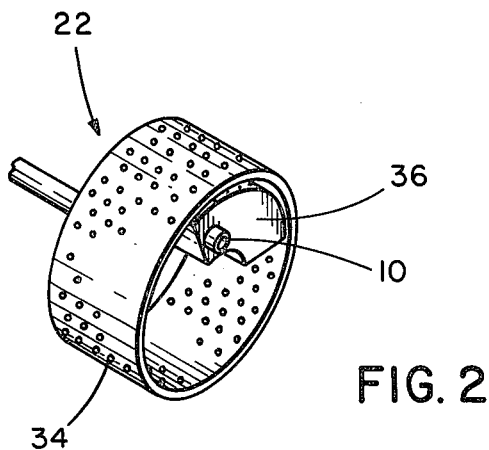
FIG. 2 is a perspective view of the drum separator according to the invention.

The separator 22 includes a rotating hollow cylindrical drum 34 which, as illustrated in FIG. 2, is provided with a plurality of openings 35 over its surface to permit the flow of air therethrough. The drum is supported for rotation on shaft 37 in the direction indicated by the arrow in FIG. 1. Positioned inside the drum 34 is an enclosed stationary pressure box 36 having appropriate air seals 38 adjacent the surface of the drum 34. Located within the pressure box 36 are a plurality of alternating pole magnets positioned sufficiently close to the inner surface of the drum 34 so as to attract the rebounding particulate to the outer surface of the rotating drum. The sealed pressure box 36 is supplied with a source of air under pressure through opening 40. This air escapes from the pressure box through the openings 35 in the rotating drum.

As will be apparent from the foregoing description, as drum 34 rotates, the rebounding ferromagnetic particulate (and any intermingled debris) is attracted to the surface of the drum adjacent the end of the scroll 20 by virtue of the stationary magnets 35 disposed beneath the drum. At the same time, due to the air pressure maintained within the pressure box 36, air continually blows from the pressure box outwardly to the drum exterior for the purpose of removing the intermingled debris from the magnetic particulate. The debris is blown upwardly into the primary dust collector system leaving substantially clean shot attracted to the rotating outer surface of the drum. As each portion of the drum rotates past the pressure box 36 the shot supported thereon is no longer magnetically attracted to the drum surface and accordingly drops downwardly into the hopper 14 for reuse.

An important aspect of the invention is the provision of the alternating N-S pole pieces so that the particulate flipflops or tumbles as the drum rotates past the pole pieces. This motion of the shot tends to expose all surfaces to the action of the pressure box air blast to insure that substantially all debris is removed from the shot.

Figure 3:
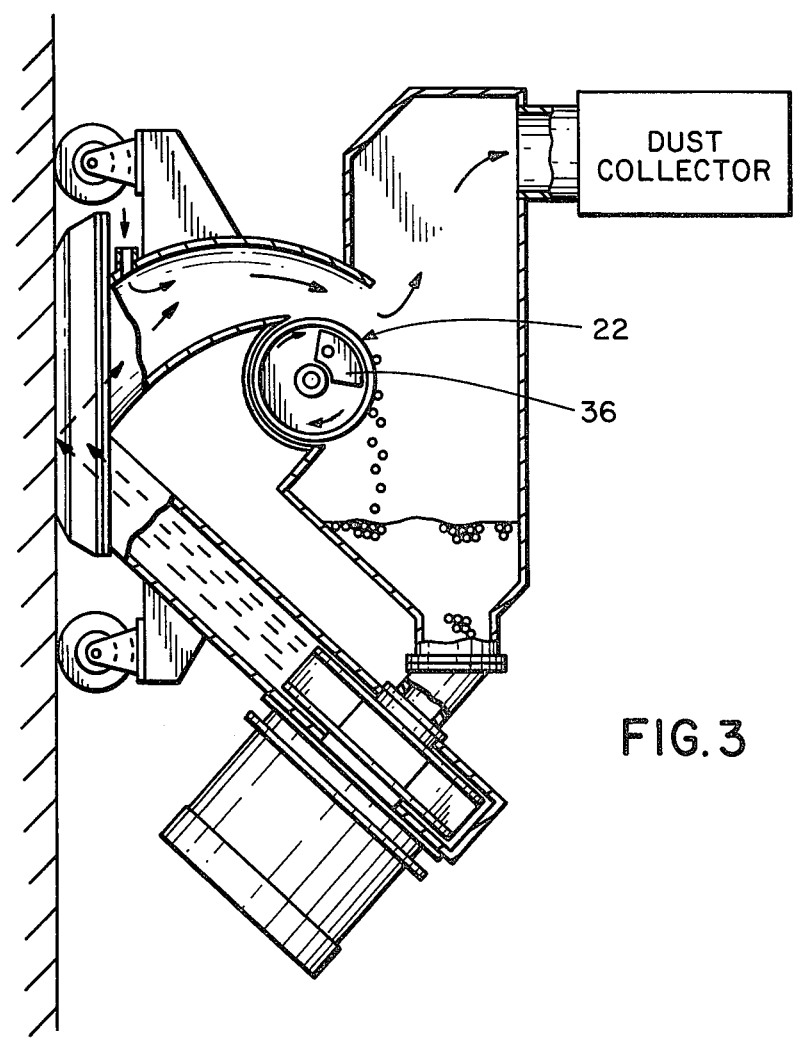
FIG. 3 is a sectional side view of a vertical surface treatment device disclosed in U.S. Pat. No. 3,900,969 having a drum separator according to the present invention added thereto.

While I have shown and described embodiments of this invention in some detail, it will be understood that this description and illustrations are offered merely by way of example, and that the invention is to be limited in scope only by the appended claims. For example, the drum separator of the present invention can be incorporated into devices for treating vertical surfaces or those which employ upwardly projected particulate as, for example, the devices described and illustrated in U.S. Pat. Nos. 3,900,969 and 3,934,372 assigned to the present assignee and hereby incorporated by reference. FIG. 3 of the present disclosure is a reproduction of FIG. 1 of U.S. Pat. No. 3,900,969 illustrating the use of the magnetic drum separator according to the present invention in a vertical surface treatment device. Reference is made to that patent for the details of the FIG. 3 device apart from the separator drum.

I claim:

1. A surface treatment device projecting ferromagnetic particulate onto a surface and capable of recovering said particulate comprising:
   (a) means for projecting said particulate onto the surface to be treated,
   (b) means for supplying particulate to said projecting means,
   (c) means for directing particulate rebounding from the surface back to said supply means,
   (d) means for separating said particulate from non-magnetic debris generated by the treatment process disposed between said directing means and said supply means, said separating means including:
      (i) a perforated rotating drum,
      (ii) means for magnetically attracting said particulate onto the surface of said drum at selected locations, and
      (iii) means positioned inside said drum for blowing air upwardly through the perforations in said drum only at said selected locations.

2. The device according to claim 1 wherein said projecting means includes a centrifugal blasting wheel.

3. The device according to claim 1 wherein said supplying means includes a supply hopper.

4. The device according to claim 1 wherein said directing means includes a rebound corridor forming a passage way from the area of surface treatment back to said supply means.

5. The device according to claim 1 wherein said separating means further includes dust collecting means for drawing air through said device to collect air entrained non-magnetic debris after separation from said particulate.

6. The device according to claim 1 wherein said magnetic means includes at least one magnet secured in a fixed position in close proximity to the inside circumference of said rotating drum.

7. The device according to claim 1 wherein said magnetic means includes a plurality of magnets arranged in an alternating polarity pattern whereby the particulate magnetically attracted to said drum is caused to tumble on the drum surface.

8. The device according to claim 1 wherein said means for blowing air includes:
   (a) a stationary pressure box positioned inside said drum behind the selected locations of said drum to which said particulate is magnetically attracted, said box being substantially air tight except in a direction toward the drum perforations,
   (b) means for pressurizing said box to cause air to pass from said box outwardly through said drum perforations past the particulate attracted to the drum whereby said non-magnetic debris intermingled with the particulate on said drum is removed.

9. The device according to claim 8 wherein said separating means further includes dust collecting means for drawing air through said device to collect air entrained non-magnetic debris after separation from said particulate.

10. The device according to claim 8 wherein said magnetic means are positioned within said pressure box.

11. The device according to claim 10 wherein said magnetic means includes a plurality of magnets arranged in an alternating polarity pattern whereby the particulate magnetically attracted to said drum is caused to tumble on the drum surface.

12. In a surface treatment device for projecting ferromagnetic particulate onto a surface and recovering said particulate the improvements comprising:
   means for separating said particulate from nonmagnetic debris generated by the treatment process, said separating means including:
      (i) a perforated rotating drum,
      (ii) means for magnetically attracting said particulate onto the surface of said drum at selected locations, and
      (iii) means positioned inside said drum for blowing air upwardly through the perforations in said drum only at said selected locations.

13. The device according to claim 12 wherein said magnetic means includes at least one magnet secured in a fixed position in close proximity to the inside circumference of said rotating drum.

14. The device according to claim 13 wherein said magnetic means includes a plurality of magnets arranged in an alternating polarity pattern whereby the particulate magnetically attracted to said drum is caused to tumble on the drum surface.

15. The device according to claim 12 wherein said means for blowing air includes:
   (a) a stationary pressure box positioned inside said drum behind the selected locations of said drum to which said particulate is magnetically attracted, said box being substantially air tight except in a direction toward the drum perforations, (b) means for pressurizing said box to cause air to pass from said box outwardly through said drum perforations past the particulate attracted to the drum whereby said non-magnetic debris intermingled with the particulate on said drum is removed.

16. The device according to claim 15 wherein said magnetic means are positioned within said pressure box.

* * * * *